United States Patent
Pocratsky et al.

(10) Patent No.: US 9,351,481 B2
(45) Date of Patent: May 31, 2016

(54) CARPENTER BEE TRAP DEVICE

(71) Applicants: Laurel Highlands Living, LLC, Acme, PA (US); John Kevin Abraham, Wexford, PA (US)

(72) Inventors: Ronald J. Pocratsky, Acme, PA (US); John Kevin Abraham, Wexford, PA (US)

( * ) Notice: Subject to any disclaimer, the term of this patent is extended or adjusted under 35 U.S.C. 154(b) by 320 days.

(21) Appl. No.: 14/155,568

(22) Filed: Jan. 15, 2014

(65) Prior Publication Data

US 2014/0202066 A1 Jul. 24, 2014

Related U.S. Application Data

(60) Provisional application No. 61/754,628, filed on Jan. 20, 2013, provisional application No. 61/819,620, filed on May 5, 2013.

(51) Int. Cl.
| | |
|---|---|
| *A01M 7/00* | (2006.01) |
| *A01M 1/10* | (2006.01) |
| *A01M 1/02* | (2006.01) |
| *A01M 1/14* | (2006.01) |
| *A01M 1/24* | (2006.01) |

(52) U.S. Cl.
CPC .............. *A01M 1/106* (2013.01); *A01M 1/02* (2013.01); *A01M 1/14* (2013.01); *A01M 1/24* (2013.01)

(58) Field of Classification Search
USPC ............................ 43/132.1, 107, 114, 133, 58
See application file for complete search history.

(56) References Cited

U.S. PATENT DOCUMENTS

| | | | | |
|---|---|---|---|---|
| 4,244,134 A | * | 1/1981 | Otterson | A01M 23/005 43/114 |
| 4,395,842 A | * | 8/1983 | Margulies | A01M 1/02 43/114 |
| 5,497,576 A | * | 3/1996 | Nowak | A01M 23/005 43/114 |
| 5,950,356 A | | 9/1999 | Nimocks | |
| 5,953,855 A | | 9/1999 | Edwards | |
| 6,370,812 B1 | | 4/2002 | Burns et al. | |
| 6,766,611 B2 | * | 7/2004 | Prince | A01M 1/04 220/6 |
| 7,093,389 B1 | * | 8/2006 | Meier | A01M 1/106 43/107 |
| 7,222,453 B2 | | 5/2007 | Uhl | |
| 7,632,167 B1 | * | 12/2009 | Miller | A01M 1/106 43/121 |
| 7,726,063 B2 | * | 6/2010 | Hawkins | A01M 23/005 43/114 |
| 7,757,432 B2 | | 7/2010 | Gunderman, Jr. | |
| 8,375,624 B2 | * | 2/2013 | Blazer | A01M 1/106 43/107 |
| 2007/0151142 A1 | * | 7/2007 | Suteerawanit | A01M 1/106 43/122 |
| 2008/0052982 A1 | * | 3/2008 | Windsor | A01M 1/14 43/114 |
| 2010/0139151 A1 | | 6/2010 | Cwiklinsky et al. | |
| 2010/0269402 A1 | * | 10/2010 | Blazer | A01M 1/106 43/107 |

* cited by examiner

*Primary Examiner* — Christopher P Ellis

(74) *Attorney, Agent, or Firm* — McKay & Associates, PC

(57) ABSTRACT

A trap device for a carpenter bee. A first lure comprises an entry hole defined through an enclosure. A second lure comprises a tunnel extending from the entry hole into the interior. A third lure comprises a means for allowing natural sunlight to penetrate into the interior such that a bee passing into the tunnel is lured towards the exit. A tray is situated within the interior past the exit, the tray containing a sticky substance such that the bee is immobilized upon traveling into the interior. An optional bait lure is utilized consisting of either female bee pheromone or a fragrance. Therefore, a bee, attracted to the natural wood of the enclosure and entry hole, enters the tunnel, turns by natural instinct to follow the path of two chambers and makes contact with the sticky pad to become immobilized.

20 Claims, 6 Drawing Sheets

CARPENTER BEE TRAP DEVICE

CROSS-REFERENCE TO RELATED APPLICATIONS

The instant application claims benefit of provisional application Ser. No. 61/754,628 filed Jan. 20, 2013, and provisional application Ser. No. 61/819,620 filed May 5, 2013, the contents of both of which are herein incorporated by reference.

BACKGROUND

1. Field of the Invention

The present invention relates to flying insect trapping devices. Specifically, the instant invention is for trapping and containing carpenter bees.

2. Description of the Related Art

It is known that carpenter bees are attracted to wood which they can bore into to establish a nest, depositing their eggs in constructed gallery tunnels. Carpenter bees have been known to not only be a nuisance, but also cause tremendous amounts of damage to wooden structures such as wooden soffit and fascia, siding, decks, doors, windowsills, roof eaves, shingles, and railings. Because of the obvious risks associated with treating carpenter bee holes in eaves or soffits, many homeowners will contract with a licensed pest control company to get rid of the carpenter bees. The first step in the treatment of the carpenter bee problem is to apply an insecticidal dust, gel, or other products, directly into nest openings. Treatment is done in the spring when the bees are first observed, and again in mid-summer to kill any bees that continue to emerge, and up until early fall to contact any over-wintering bees occupying the tunnels. In the fall, the holes should be filled with wood putty or wooden dowels and the entire wood surface painted or varnished.

Traps are employed as preventive measures. There are different types of carpenter bee traps that are known in the art. For example, U.S. Pat. No. 6,766,611 to Prince shows a carpenter bee trap comprised of a housing having a hollow interior and at least one solid wall having a hole formed therein to permit carpenter bees to enter the hollow interior of the housing. U.S. Pat. No. 7,757,432 to Gunderman, Jr. teaches an electronic carpenter bee trap having a housing that contains a hole, an electrode in proximity to the hole, and a power source connected to the electrode. The carpenter bees will enter the hole, and make contact with an electrode. Once the carpenter bee makes contact with the electrode, a high voltage discharge will take place through the body of the carpenter bee, thus killing the carpenter bee. U.S. Pat. No. 8,375,624 to Blazer et al. shows a carpenter bee trap comprising of a trap entrance unit having at least one entrance hole in at least one side; and at least one receptacle adapter coupling allowing easy attachment and removal of at least one receptacle; and at least one removable receptacle attached to at least one receptacle adapter coupling thereby allowing bees in the trap entrance unit to enter at least one removable receptacle. U.S. Publication 20080052982 to Windsor includes a trap body, at least one longitudinal passage, and at least one insect entryway. The longitudinal passage is positioned within the trap body so that it is exposed when the wood-boring insect trap is not installed on a structure to be protected, and enclosed when the trap is installed on the structure. The entryway intersects the longitudinal passage and allows wood-boring insects to enter the trap, proceed to the passage, where the insect will encounter an insect disabling substance. U.S. Pat. No. 6,138,402 to Wotton shows a decorative insect trap that includes a decorative cover, a container, and a funnel. The cover is preferably shaped in the form of a fanciful character and has an insect entry, a container opening, and a central window. The container has a mouth and is preferably an empty conventional two-liter plastic beverage bottle.

Prior art devices suffer generally from their ability to accurately mimic the natural habitat and characteristics of a carpenter bee. For instance, they provide ambient light and not natural sunlight. Prior art tunnels and entryways are inaccurate. Moreover, naturally-occurring baits such as pheromone are not used. Finally, prior art traps are uneconomical and inconvenient as bees must be removed by the user if stuck in the sticky substance, and new replacement substances must be ordered from the trap maker which must then be applied manually to the trap by squeezing from a tube or by applying it by some other mechanical means, thus posing an uneconomical solution for the user of the traps.

SUMMARY

It is the objective of the instant invention to provide a trap device well-suited to capture carpenter bees.

It is further an objective to provide a trap which significantly mimics the natural characteristics and environment of a carpenter bee.

It is further an objective to provide a trap device which is aesthetically-pleasing.

It is further an objective to provide a trap device which is easy to clean and maintain.

It is further an objective to provide a trap device which uses all possible luring methods and means.

Accordingly, the instant invention comprehends a trap device, comprising an enclosure having an exterior, an interior, and a bottom. A first lure comprises an entry hole defined through the exterior into the interior. A second lure comprises a tunnel extending from the entry hole into the interior. A third lure comprises a means for allowing natural sunlight to penetrate into the interior such that a bee passing into the tunnel is lured towards the exit. A tray is situated within the interior past the exit, the tray containing a sticky substance such that the bee is immobilized upon traveling into the interior.

The bore is defined above the entry hole and the bottom of the enclosure, and further defined distal to the entry hole. Also, the tunnel extends from the entry hole into the housing, the tunnel being seamless having a totally enclosed volume throughout and having a first chamber and a second chamber, the first chamber extending substantially vertically from the bottom into the housing, the second chamber extending substantially perpendicular from the first chamber to terminate at a tunnel exit within the interior. An optional bait lure can also be utilized consisting of either female bee pheromone or a fragrance. Therefore, a bee, attracted to the natural wood of the enclosure and entry hole, enters the tunnel, turns by natural instinct to follow the path of the two chambers, is lured from the tunnel by natural sunlight being emitted into the interior, and as the bee journeys towards the natural sunlight on the other side of the device, it is looking for a way out. It is then that the carpenter bee makes contact with the sticky pad and becomes immobilized in the sticky substance of the pad.

DETAILED DESCRIPTION OF THE PREFERRED EMBODIMENT

Figure 1:
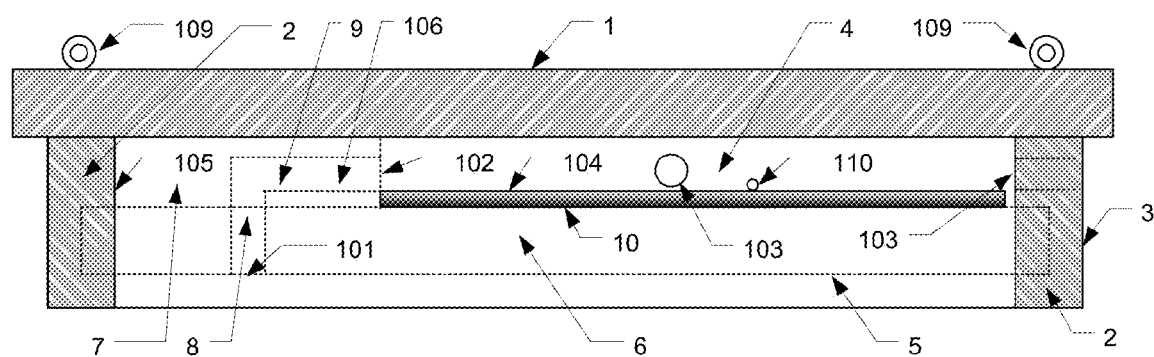
FIG. 1 shows a front elevation view of the instant trap device.
Figure 2:
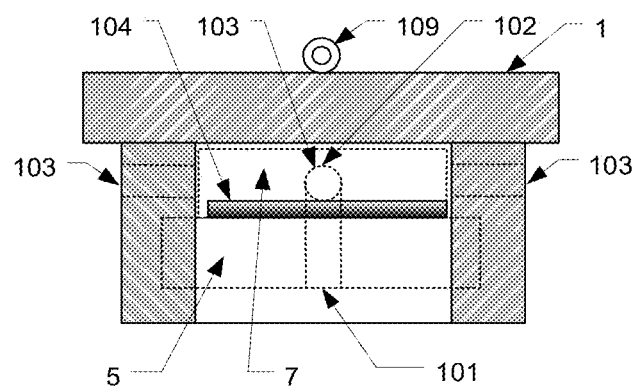
FIG. 2 shows a left end view in elevation.
Figure 3:
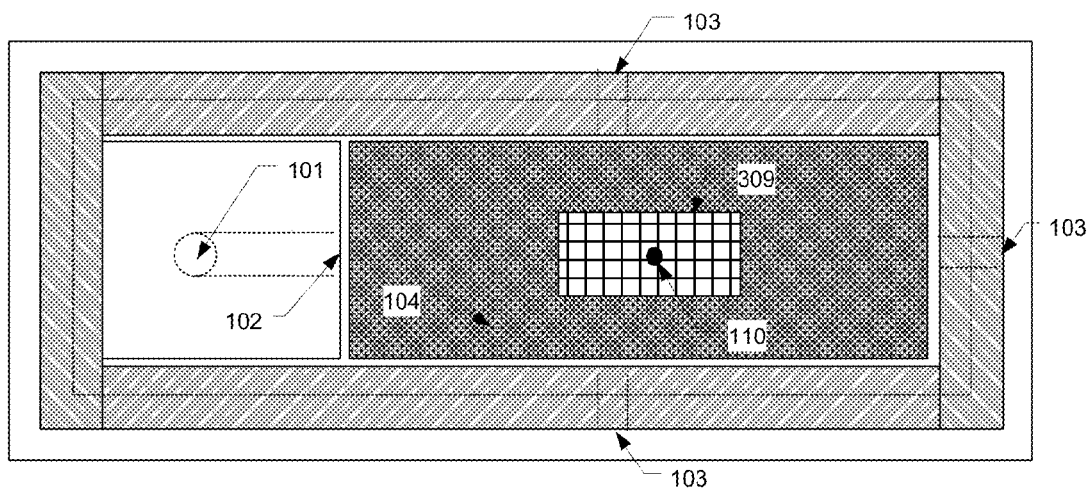
FIG. 3 shows a top elevation view.

With reference then to FIGS. 1-3, shown is the instant invention comprehending an enclosure 105. As shown, enclosure 105 is a box-like container having a top 1, two ends 2, an exterior 3, an interior 4, and a bottom 5. Eyeholes 109 or similar attachment means allow the enclosure to be hung underneath a roof, for example, above the ground. For optimum effectiveness, the material of the enclosure 105 should be constructed of one that carpenter bees prefer to bore in (such as cedar, pine, redwood, etc.). A variety of enclosure styles may be used to improve appearance. Additionally, since the number of sides, ends, holes, tunnels, and bores may vary, "a" or "an" as used in the claims means one or more as it relates to any component.

A floor 6 preferably extends up from bottom 5. In the alternative the height of the bottom 5 can be expanded within interior 4 to provide a base. Situated on raised floor 6 is a housing 7. Preferably, housing 7 is formed or disposed at the bottom 5 proximate to one of the ends 2 of enclosure 5. As will be further described, important is that the housing 7 is situated near the end 2 most distal to one or more sunlight bores 103 defined through enclosure 105.

Defined through the bottom 5 of the enclosure is a first lure 101. First lure 101 comprises an entry hole defined with a diameter preferably in the range of ⅜" to 9/16". As such, the first lure 101 (entry hole) is an entrance point into the enclosure 105 and approximates the size of a hole typically bored by a carpenter bee by its natural instinct. Therefore, first lure 101, taking the form of a wooden entry hole, acts as a natural, foremost attractant for a carpenter bee.

Aligned with first lure 101 entry hole is a second lure 106. Second lure 106 takes the form of a tunnel, wherein tunnel includes a first chamber 8 and a second chamber 9. Thus, housing 7 provides the medium into which the second lure 106 is defined. As such, the housing 7 may also be moved if desired to various locations throughout the enclosure 105 if alternative entry holes are defined, thus providing variable, or multiple, tunnel locations. First chamber 8 is a hollow path which is defined to extend substantially vertical from entry hole into housing 7. Although the first chamber 8 does not have to be vertical, e.g. the first chamber 8 could extend forty-five (45) degrees relative to the bottom 5, in the preferred embodiment it is substantially vertical. "Substantially" vertical means the first chamber 8 is at or near perpendicular relative to the position of the bottom 5, varying nominally only by variances in manufacture. Second chamber 9 is preferably perpendicular to first chamber 8 to extend generally parallel to bottom 5 (if first chamber is vertical) and terminate at tunnel exit 102. Mimicking the natural environment of the carpenter bee, each chamber 8, 9 is generally cylindrical to have a totally enclosed volume throughout and is seamless. Each chamber 8, 9 does not have to be exactly cylindrical since a bee would unlikely produce a perfect cylinder (hence "generally" cylindrical), but it is critical that the chamber have natural characteristics to look and feel. Therefore, "seamless" as used herein means the tunnel has a generally uniform inner wall with no seams, and in particular no axial seams which would traditionally result when two plates are stacked on top of one another. Thus, the tunnel excludes any artificial interruptions which would detract from the natural appearance and natural feel of a bee-made tunnel, formed as a ninety-degree, seamless pathway from entry hole into interior 4 just as the bee would construct. The tunnel 106 is where the carpenter bee turns by natural instinct to approximately 90 degrees (near a right angle). The length of the tunnels may vary. But a bee turns approximately ninety-degrees by natural instinct, so the purpose of the ninety (90) degree turn is to enhance the effectiveness when the bee is inside the enclosure, as it simulates the action of the carpenter bee in actual life as it would normally turn and then create its own carpenter bee bored gallery (hence "second" lure).

A third lure 103 as part of the device comprises a means for allowing natural sunlight to penetrate into the interior 4 of the enclosure 105. Whereas prior art devices may use plastic components to allow for the emission of ambient light, incoming ambient light (light which is first reflected, refracted, dispersed, etc.) is not as attractive as natural sunlight. Provided as the third lure 103 then is one or more ("a") bores defined distal to the entry hole, laterally through the enclosure 105 and also elevated from the entry hole. Although some bees find the third lures 103, bees prefer the downward-facing holes, and the third lures 103 are best avoided by their placement farthest and off-axis from the first lure 101 entry holes. For example, as shown: a bore is above the level of first lure 101 entry hole; defined closer to the end 2 opposite the second lure 106 and thus away from the tunnel exit 102; and, "laterally" means the axis of the hole or bore is generally perpendicular to the axis of the entry hole (or generally parallel to the tunnel exit) so as to maximize beam intensity. The bore contains no plastic or glass shield or window and is therefore an exposed hole. As such, a carpenter bee passing through second chamber 9 is drawn to tunnel exit 106 and next into interior 4 as it is lured by the sight and feel of the natural sunlight beam passing through third lure 103 bore.

A tray 10 is situated within the interior 5 past the tunnel exit 102. The tray 10 contains a sticky substance 104 such that a bee exiting tunnel exit 102 is immobilized upon entering interior 4. Sticky substance 104 can be any type of glue-like or adhesive material, such as those typically used for pre-existing rodent or pest traps. In the preferred embodiment the tray is removable and thus not integral with the bottom 5 of the enclosure 105 so that the sticky substance 104 containing any bees can be removed and easily replaced within the device. "Tray" as herein defined means any type of container and also means any removable component which has the sticky substance integrated therein, such as a foam pad.

An optional lure 110 comprising a bait can be disposed within enclosure, preferably on the tray 10 (or on pad). In the preferred embodiment the optional lure 110 bait consists of female bee pheromone. Again, most mimicking the natural environment of a carpenter bee, the pheromone is allowed to be secreted by a female bee which has entered the interior. The pheromone attracts other male bees. Additional pheromones can be added, i.e. "manually" to the tray or on separate components termed herein bait stations 309, such as pre-fabricated mats which can then be removably placed within the tray. The bait stations 309 can have the optional lure incorporated therein. Optional lure 110 bait may also consist of fragrances such as synthetic sex pheromones or additional natural smell of wood, especially yellow and white pine and aged cedar.

In use then, a bee, attracted to the natural wood of the enclosure 105 and entry hole 101, enters the tunnel 106 simulation. The bee turns by natural instinct to follow the path of the two chambers 8, 9 of the tunnel 106 and is additionally lured from the tunnel 106 by natural sunlight being emitted into the interior 4, thus exiting from tunnel exit 102. As the bee journeys towards the natural sunlight on the other side of the device, it is looking for a way out. It is then that the carpenter bee makes contact with the sticky pad 104 and becomes immobilized in the sticky substance of the pad. The bait pheromone 110 is placed on the sticky pad's bait station as an additional lure for the carpenter bee.

Figure 4:
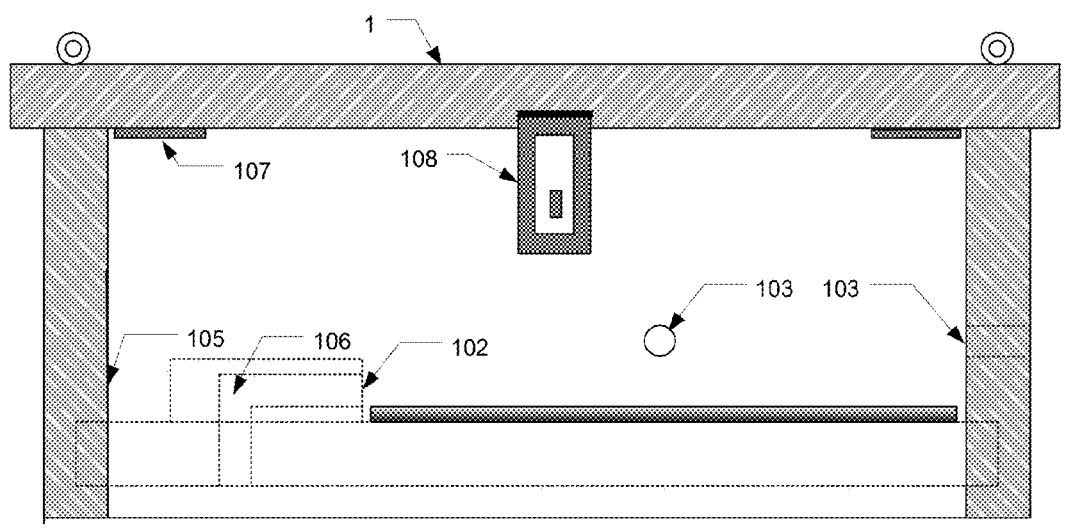
FIG. 4 shows a front elevation view of an alternative embodiment of the instant trap device with dimensional changes and a hinged top.

Referencing now FIG. 4, although the enclosure may be sealed by various types of lids and mechanisms, enclosure 105 preferably has one or more hinges 107 at the top 1 so that the top 1 of the "box" can be swung open for easy access to check, remove, or modify the contents of the enclosure 105. A latch 108 secures the enclosure 105 and allows it to be locked if so desired. Although shown generally as a rectangle, enclosure 105 can take any form or shape for aesthetic purposes as long as it acts as an enclosure for the components herein described. Shown here is an embodiment wherein enclosure 105 is generally taller in height. In this manner, third lure 103 natural sunlight bores are in a more elevated position relative to the tunnel exit 102 of tunnel 106.

Figure 5:
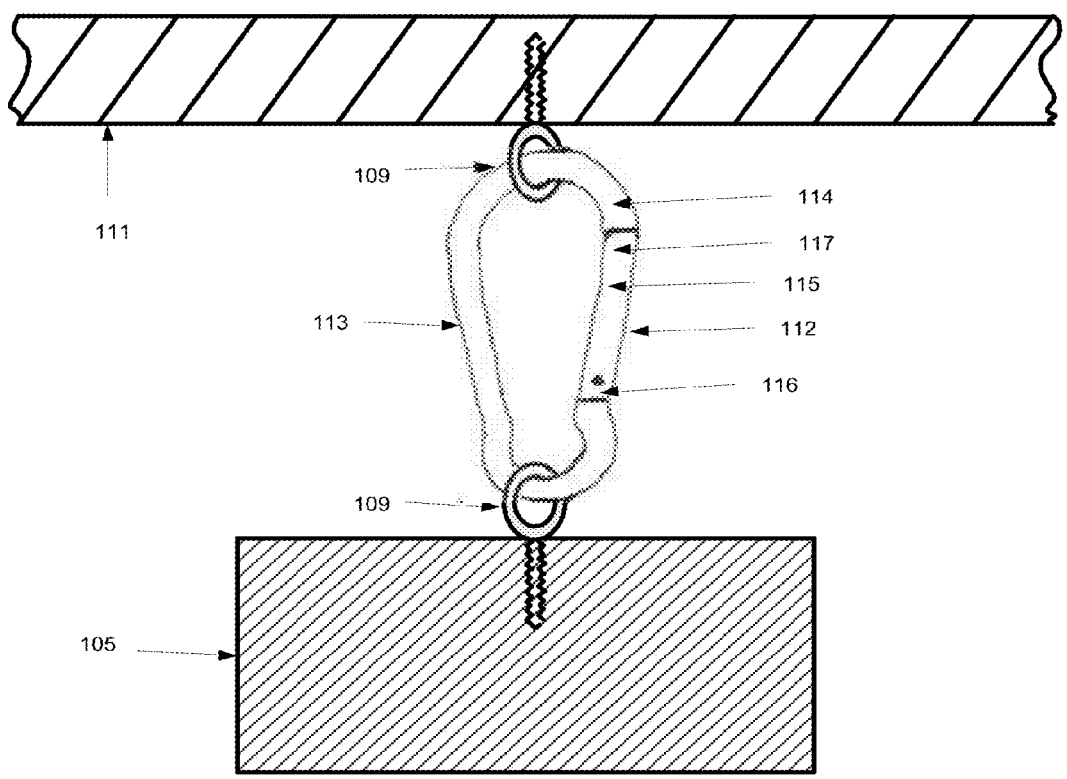
FIG. 5 shows one embodiment of a hanging mechanism which may be used to mount the instant trap device.

FIG. 5 shows a means for mounting the enclosure 105 to a substrate 111. "Substrate" means any medium on which the enclosure can be mounted, including but not limited to a roof or porch overhang, a shed, a deck, or a tree. As above, an eye screw forming an eyehole 109 is attached to both the device and the substrate 111. Provided herein is spring quick-link 112 having an integral side 113 and a pivoting side 114. Pivoting side 114 includes pivot member 115 having pivoting end 116 and free end 117, wherein pivoting end 116 is attached to pivoting side 114 using a torsion spring (not shown). Free end 117 is detached from pivoting side 114 but engages pivoting side 114 when torsion spring is in a relaxed state to form an enclosed loop. In this manner, the device is easily mounted and dismounted by holding and then pressing in and opening the spring quick-link at the pivot member 115 (side that opens). This allows the user to connect or disconnect the spring link to the eye holes 109. Although eye screws are illustrated herein, other hardware may be used in conjunction with the spring quick-link, such as eye bolts, screw hooks, chain links, etc. This mounting/dismounting method can be used for interior and exterior applications. For exterior applications, the hardware and spring quick-links could be manufactured of materials that are resistant to the elements of weather, such as aluminum or stainless steel, or coated with a non-corrosive material such as zinc.

Figure 6:
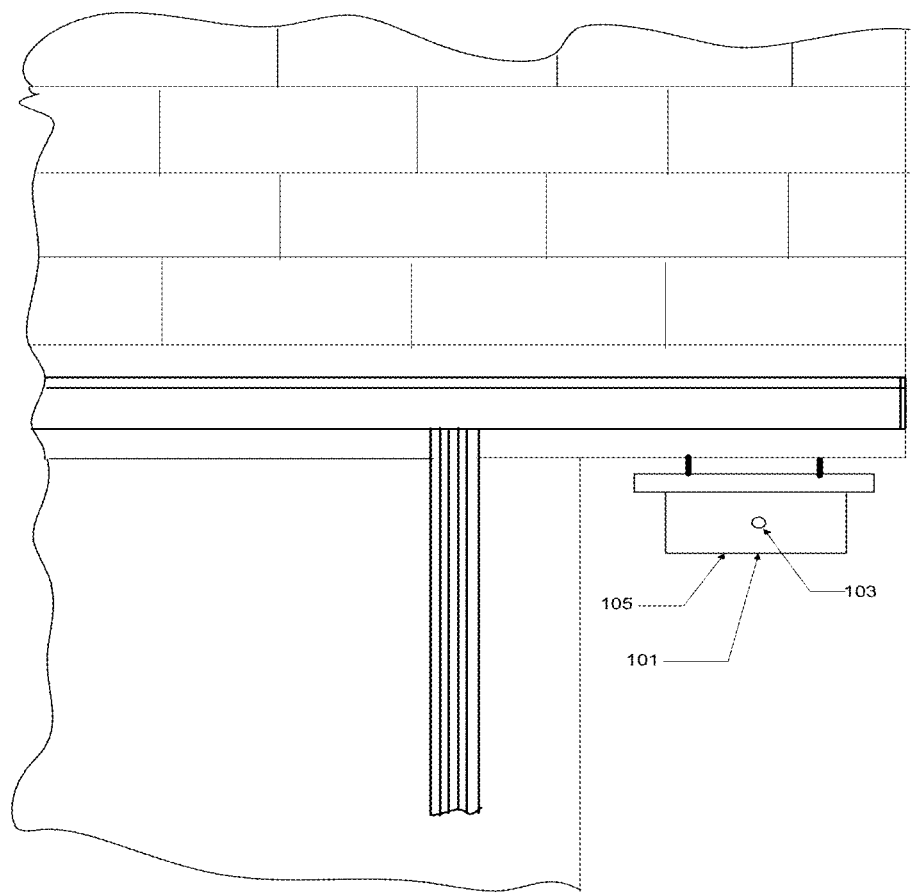
FIG. 6 shows a right end view in elevation and as in use under the overhang of a house roof.

FIG. 6 is an illustration of the instant invention mounted under an overhang of the corner of a wooden structure as the substrate with high activity of carpenter bees seeking to establish a nesting site. As above, eyeholes (109 of FIG. 1) or similar attachment means allow the enclosure to be hung underneath a roof, for example, above the ground. Shown also is the natural sunlight bore 103 facing outward away from the structure, towards the surroundings with the entry hole 101 facing downward toward the ground. The bottom 5 can remain untreated and with unfinished wood to enhance carpenter bee attraction. The Carpenter Bee Trap Device is made to stay shut during the busy bee destructive season, but can be opened when necessary or locked and unlocked with an optional "easy access" key. An optional window that slides open or closed (when in use) can be made part of the structure to allow viewing of the contents of the device when in operation. This device can be constructed in various sizes and shapes emphasizing the sophisticated attractiveness of the invention and how it does not look like a trap, but rather a bird feeder or a bird house. A time-tested device, the device can be used year after year, as a preventative device to help capture any bees that try to drill into wooden structures.

We claim:

1. A trap device, comprising:
   an enclosure having an exterior, an interior, and a bottom;
   a first lure comprising an entry hole defined through said exterior into said interior;
   a second lure comprising a tunnel extending from said entry hole into said interior;
   a third lure comprising a means for allowing natural sunlight to penetrate into said interior such that a bee passing into said tunnel is lured towards said exit; and,
   a tray situated within said interior past said exit, said tray containing a sticky substance such that said bee is immobilized upon traveling into said interior.

2. The trap device of claim 1, wherein said means for allowing natural sunlight to penetrate into said interior comprises a bore defined laterally through said enclosure.

3. The trap device of claim 2, wherein said bore is defined above said entry hole and above said bottom of said enclosure.

4. The trap device of claim 3, wherein said bore is defined distal to said entry hole.

5. The trap device of claim 1, wherein said tray is removable.

6. The trap device of claim 1, further comprising a lid for said enclosure, said lid hingedly attached to a top of said enclosure to cover said enclosure.

7. The trap device of claim 6 further comprising an eyehole fixed to said lid such that said enclosure can be hung.

8. A trap device, comprising:
   an enclosure having an exterior, an interior, and a bottom;
   a housing disposed at said bottom of said enclosure within said interior;
   a first lure comprising an entry hole defined at said bottom through said exterior and into said housing;
   a second lure comprising a tunnel extending from said entry hole into said housing, said tunnel being seamless having a totally enclosed volume throughout and said tunnel having a first chamber and a second chamber, said first chamber extending substantially vertically from said bottom into said housing, said second chamber extending substantially perpendicular from said first chamber to terminate at a tunnel exit within said interior; and,
   a tray situated within said interior past said tunnel exit, said tray containing a sticky substance such that said bee is immobilized upon traveling into said interior.

9. The trap device of claim 8, wherein said housing is disposed proximate to an end of said enclosure.

10. The trap device of claim 8, wherein said housing is movable within said enclosure to vary a location of said tunnel.

11. The trap device of claim 8, wherein said second chamber is entirely cylindrical and has a second diameter equal to a first diameter of said first chamber.

12. The trap device of claim 8, wherein said tray is removable.

13. The trap device of claim 8, further comprising a lid for said enclosure, said lid hingedly attached to a top of said enclosure to cover said enclosure, said lid including an eyehole fixed thereto such that said enclosure can be hung.

14. A trap device, comprising:
   an enclosure having an exterior and an interior;
   a first lure comprising an entry hole defined through said exterior into said interior;

a second lure comprising a tunnel extending from said entry hole into said interior, such that a bee can enter said tunnel through said entry hole; and, a tray situated within said interior past said exit, said tray containing a sticky substance such that said bee is immobilized upon traveling into said interior; and, a third lure comprising bait, said bait disposed on said tray within said sticky substance.

15. The trap device of claim 14, wherein said bait consists of female bee pheromone.

16. The trap device of claim 15, wherein said female bee pheromone is allowed to be secreted naturally by a female carpenter bee.

17. The trap device of claim 15, wherein said female bee pheromone is manually disposed on said tray.

18. The trap device of claim 14, wherein said bait consists of a fragrance.

19. The trap device of claim 14 further comprising a bait station disposed within said tray.

20. The trap device of claim 19 wherein said bait is incorporated into said bait station.

* * * * *